May 25, 1937.  T. C. MOORSHEAD  2,081,895
GLASS FORMING MACHINE
Filed Nov. 28, 1936  7 Sheets-Sheet 1

May 25, 1937.   T. C. MOORSHEAD   2,081,895
GLASS FORMING MACHINE
Filed Nov. 28, 1936   7 Sheets-Sheet 6

Fig. 4.

Thomas Courtney Moorshead INVENTOR
BY Green + McCallister
His ATTORNEYS

Fig. 5.

Patented May 25, 1937

2,081,895

UNITED STATES PATENT OFFICE 2,081,895

GLASS FORMING MACHINE

Thomas Courtney Moorshead, Strand, London, England, assignor to Ball Brothers Company, Muncie, Ind.

Application November 28, 1936, Serial No. 113,165
In Great Britain September 17, 1935

17 Claims. (Cl. 49—5)

This invention relates to glass forming or shaping machines and particularly to rotary machines suitable for use in the formation of hollow glass ware, for example, machines operating on the press and blow system.

In U. S. Letters Patent 1,807,857 issued to me on June 2, 1931, there is described and claimed a glass shaping machine of the press and blow type employing blank and finishing molds and in which the blank molds are filled while moving in an upright position underneath a flow feeder which is adapted to deliver a definite charge of glass into the upper open end of each mold as it passes the feeding position. The blank molds are arranged for movement in two circular or arcuate paths so that at times they are adapted to move in an outer circle or arcuate path where each receives a charge of glass and at other times they are adapted to move in an inner circle or arcuate path in order to co-operate with neck molds.

The chief object of the present invention is to provide an improved form of rotary type machine wherein the molds, instead of being filled from a flow feeder are adapted to gather their charges from a forehearth or revolving pot during the continuous rotation of the machine.

According to one feature of the invention there is provided an improved form of glass shaping machine comprising a plurality of molds mounted for movement around a central column so that at times the molds are moving in an outer arcuate path and at others they are moving in an inner arcuate path, means for swinging the molds from one path to the other and means whereby the molds whilst traversing the outer arcuate path are adapted to be pressed downwardly into a forehearth or revolving pot and filled by suction.

In order that the said invention may be clearly understood and readily carried into effect, the same will now be more fully described with reference to the accompanying drawings in which:—

The machine illustrated in the accompanying drawings is similar in many respects to that described and illustrated in said Letters Patent No. 1,807,857, particularly as regards the register heads, the neck molds and the pressing plungers and the finishing molds, and comprises a hollow stationary central column made up of a lower portion 2 and an upper portion 3. Rotatably mounted on the column is a rotary frame 4 provided with a toothed ring 7 adapted to be driven from any suitable external source of power. The lower portion of the column is equipped with a fixed inclined track 10, serving, in known manner, for controlling the movements of the finishing or blowing molds 11 each of which is provided with a carrier 12 pivoted at 13 to the rotary frame 4. Each carrier is provided with a roller 14 which travels on the surface of the track 10 and according to their positions on the track the molds 11 are raised or lowered.

Figure 1:
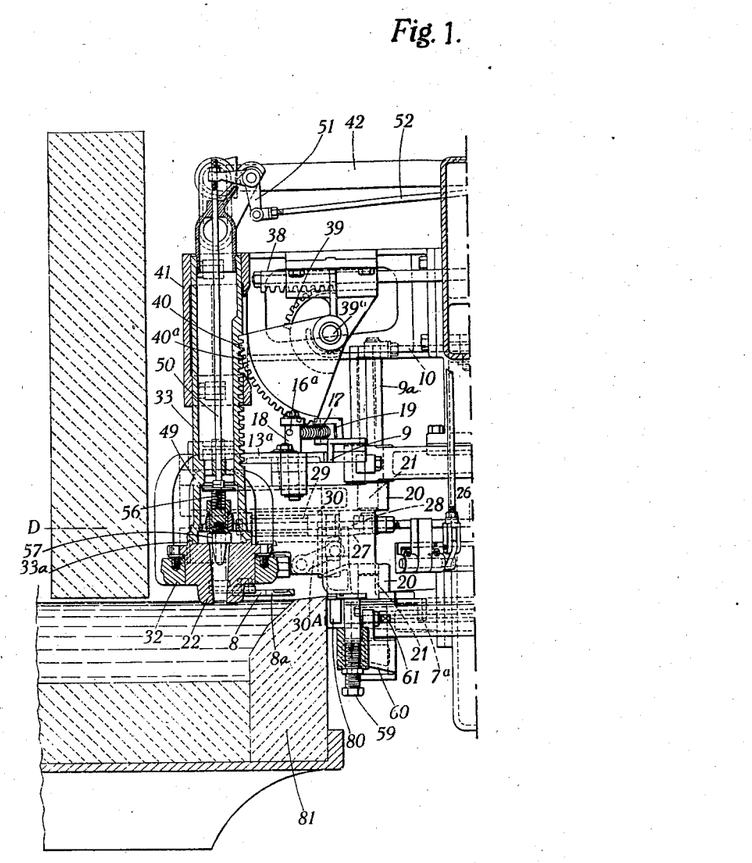
Figs. 1 and 1a are vertical sectional views of one-half of a machine embodying the invention showing a blank mold swung into its gathering position, such section being taken on the line A—A of Fig. 3.
Figure 1A:
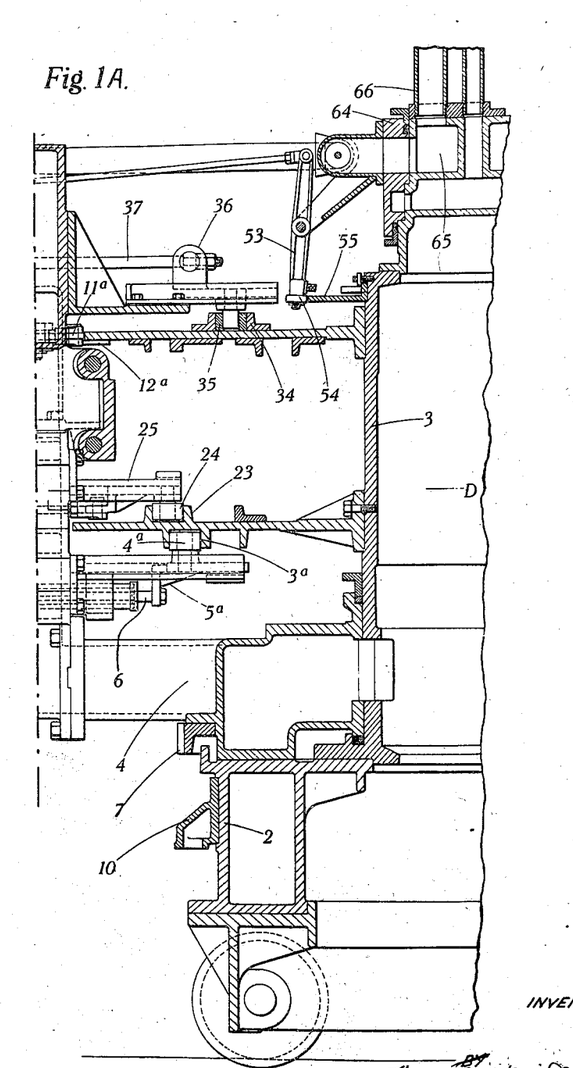

The upper portion of the stationary column is provided with a plurality of cam tracks which serve to control the operations of various elements of the machine as the rotary frame turns therearound. One cam track, for example, the cam track 3a, serves to swing the blank molds from one arcuate path to the other so as to move the same from their gathering to their pressing positions and vice versa. In this connection, it will be observed that the machine is provided with a series (e. g. eight) of blank molds each carried by one of a series of horizontally displaceable blank mold arms 20 pivotally mounted on the rotary frame at 21. The contour or form of the arms in plan can be seen from Figs. 3 and 4 and they are mounted so as to be capable of being swung on pins 21 (see Fig. 1).

The means for swinging the blank mold arms 20 in order to displace the molds from their outer or gathering positions to their pressing or inner positions comprise a cam roll 4a engaging the cam track 3a, said cam roll being carried by a radial cam slide 5a accommodated in guides on the rotary frame and interconnected through a spring pressed rod 6 (see Fig. 4) with a toothed rack 6a which meshes with a toothed sector 7a suitably secured as, for example, by a bolt or pin 7b with the inner end of the blank mold arm 20. It will be appreciated that the cam track 3a is shaped so that it is adapted to cause each of the molds, in turn, to be swung at the appropriate times, from one of its operative positions to the other and back again once every revolution of the rotary frame.

Figure 2:
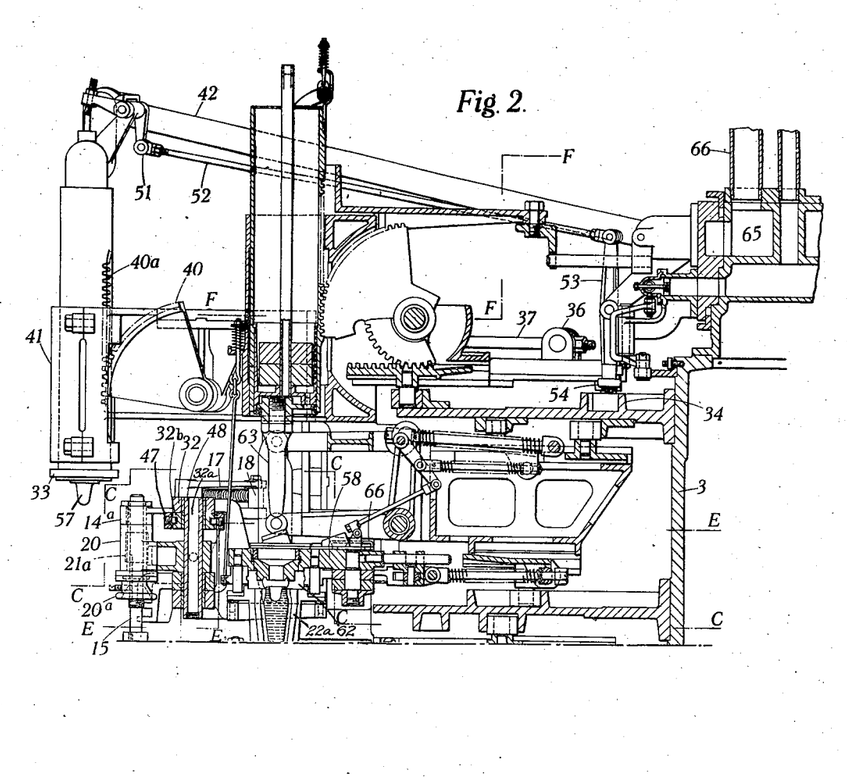
Figs. 2 and 2a are vertical sectional views of one-half of the machine shown in Fig. 1 showing a blank mold swung under a register head and ready for the pressing operation, such section being taken on the line B—B of Fig. 3.

Suitable means are also provided for severing the charges of glass gathered by the molds from the mass of glass in the forehearth or revolving pot and preferably comprise a plurality of cut-off knives 8, one for each blank mold. Each cut-off knife is secured to the lower end of a vertical shaft 15 journalled in a lug formed upon the side of the blank mold arm with which it is associated and means are provided for loading a spring during the outward movement of the blank mold arm so that, by the subsequent release of the spring, the cut-off knife can, at the appropriate time, be urged across the lower end of the charged blank mold. For example, in the embodiment illustrated, the lower end of the shaft 15 has keyed to it a knife arm 16 and the upper end of the shaft 15 has keyed to it a toothed sector 14a (see Figs. 2 and 3) which meshes with another toothed sector 13a arranged for movement about a centre 13b and formed at its opposite end with another toothed portion meshing with a toothed sector 9 mounted for movement about the centre 21, the last-mentioned sector being provided with a sleeve 9a (Fig. 6) having an arm 9b projecting therefrom which is connected to a rod 10a having a cam roll 11a engaging with the periphery of a stationary cam plate 12a (Fig. 3) carried by the central column. Also, a spring 17 is provided having one end thereof held on a gudgeon pin 18 carried by the blank mold arm 20 whilst the other end thereof is constrained against another gudgeon pin 19 carried by the sector 9, the arrangement being such that the spring is adapted to be compressed by an outward swing of the blank mold arm into the position shown in Fig. 3. The said spring is carried in known manner by a rod 16a provided with an adjustable stop nut 17a and also serves to hold the cam roll 11a hard against the cam 12a. Means are also preferably provided for enabling the height of the cut-off knife to be adjusted to suit molds of varying heights. For example, the vertical shaft 15 may be threaded through a handwheel 20a mounted on a driving sleeve 21a keyed to the aforesaid sector 14a.

Figure 3:
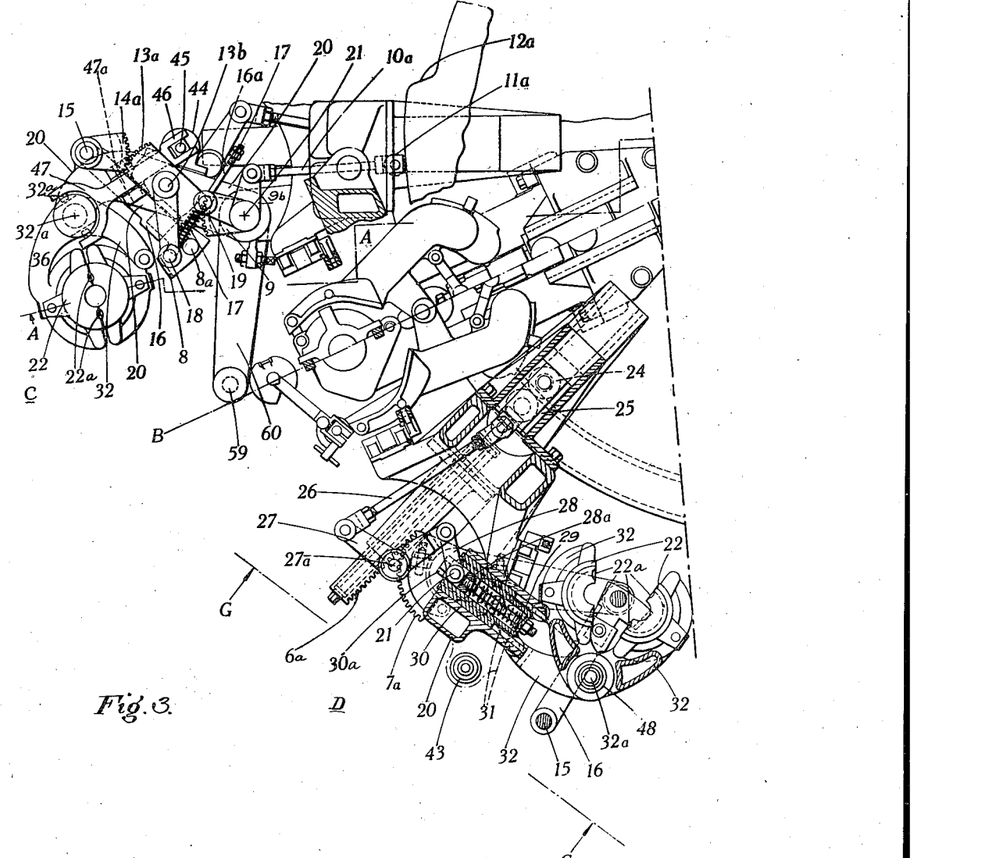
Fig. 3 is a sectional plan view showing different sector sections at different levels, the sector C being taken on the line C—C of Fig. 2 showing the blank mold in an outer position and the sector D being taken on the line D—D of Fig. 1 showing the blank mold in an inner position.
Figure 4:
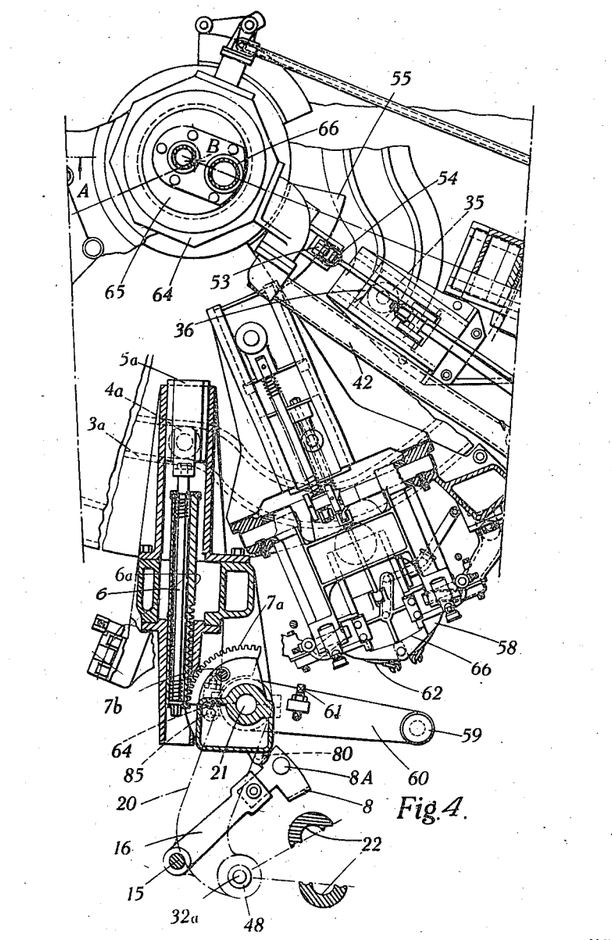
Fig. 4 is a sectional plan view taken on the line E—E of Fig. 2 with the blank mold arm swung out and showing the register head.

From the foregoing it will be appreciated that, when a blank mold arm is swung outwardly from a position such as that indicated in sector D, Fig. 3 into a position such as that indicated in sector C, the sectors 9, 13a and 14a will be brought into operation to cause the compression of the spring 17.

Each blank mold comprises two half-molds 22 provided with vacuum grooves 22a, the two halves of the mold being adjustably mounted in position on a pair of scissor arms 32 pivotally mounted at 32a on the blank mold arm 20. Suitable means are provided for effecting the opening and closing movements of the mold parts and, in the embodiment illustrated, such means comprise a cam roll 24 engaging a cam track 23 provided on one of the fixed cam plates carried by the central column 3, said cam roll being carried by a radially disposed cam slide 25 connected by a connecting rod 26 with one arm of a bell crank lever 27 pivoted at 27a on a radial extension of the rotary frame of the machine (see Figs. 1 and 3) and the other arm of the bell crank lever being connected by a link 28 with a member 28a arranged for movement in a toggle slide 30 against the action of a toggle spring 29. The toggle slide also accommodates a link or bar 30a and an equalizer slide 31a constrained against lateral movement and interconnected with a pair of toggle levers or links 31 pivotally connected with the scissor arms of the mold parts, the arrangement being such that, when the cam roll 24 is displaced outwardly from the centre of the machine, the bell-crank lever 27 will be actuated to open the mold and, when the cam roll is moved in the opposite direction, the bell crank lever will be actuated to compress the toggle spring 29 and to press the two mold parts together. In the preferred embodiment of the invention, the cam track 23 is so shaped and arranged that each blank mold is closed either before or during its movement into an outer position such as is shown by Fig. 3.

The machine also includes a plurality of suction heads 33, one for each blank mold, said suction heads being carried by outwardly extending brackets 41 mounted in position on the rotary frame of the machine so that the heads move always in a circular path disposed vertically above the outer arcuate path of the blank molds. Means are provided for raising and lowering the suction heads and, in the embodiment illustrated, the said means comprise a cam roll 35 a stationary cam track 34 formed on one of the cam plates carried by the central column 3 (see Figs. 1 and 6), the said cam roll being carried by a radially displaceable cam slide 36 interconnected by means of a connecting rod 37 with a toothed rack 38 meshing with a toothed sector 39 which is displaceable angularly about a horizontally disposed axis 39a and is keyed or otherwise secured to another toothed sector 40. The latter meshes with a toothed rack 40a formed upon or secured to one side of the suction head which, it will be observed, is hollow and extends upwardly through the bracket 41 so as to be capable of being moved vertically therein. At its lower end the suction head is formed with a spigot 33a which, when the suction head is lowered, is adapted to register with a recess formed for its reception in the upper end of the blank mold as may be seen from Fig. 1. At its upper end the suction head is connected through an elbow joint with the outer end of a radially disposed vacuum pipe 42 the inner end of which is connected through another elbow joint to allow for the up and down movements of the suction head with a rotary distributor 64 which is mounted in position on the upper portion of the central column 3 and which is maintained in communication with a suitable source of vacuum through the medium of the vacuum chamber 65 and the vacuum pipe 66. It will be appreciated that, in practice, the cam track 34 is so arranged and shaped that the cam roll 35 will be actuated to cause the suction head to be lowered as soon as or immediately after the blank mold with which it is to co-operate reaches its outer position shown in Fig. 3. The mechanism is also arranged and formed so that the amount by which the suction head is adapted to be lowered is in excess of that which is necessary to bring its spigot into registration with the recess in the upper part of the blank mold so that the suction head after being pressed into contact with the blank mold is caused to continue its downward movement and to carry with it the blank mold so that the latter is caused to dip into the mass of glass in the forehearth or revolving pot. For this purpose, the blank mold scissor arms are carried by a sleeve 48 which is mounted on the pivot 32a of the mold parts so as to be capable of longitudinal and vertical displacement and yoked around the upper bearing 32b of the sleeve is a yoke lever 47 which is pivotally mounted at 47a and the opposite end of which is coupled with a gudgeon pin 46 (Figs. 3 and 6) interconnected with the upper end of a rod 46a carrying a spring 43, the arrangement being such that, by a downward movement of the bearing 32b, a nut and washer 45 provided on the lower end of the rod 46a will cause the spring 43 to be compressed in its housing 44. Hence, by the continued downward movement of the suction head, the blank mold can be forced to dip into the glass in opposition to the force exerted by the spring 43.

Within the hollow stem of the suction head and near the lower end thereof is a vacuum valve 49 adapted to be moved downwardly off its seating, at the appropriate time, by a valve rod 50 suitably mounted in position in the suction head so that its upper end is coupled to one arm of a bell-crank lever 51 the other arm of which is interconnected by a connecting rod 52 with a pivotally mounted cam lever 53 the lower end of which is fitted with a cam roll 54 engaging with the peripheral portion of a cam plate 55 suitably mounted in position on the upper end of the column 3. The cam plate 55 is so shaped and arranged that, after the suction head and the blank mold have been lowered and the lower end of the latter has been caused to dip into the mass of glass in the forehearth or revolving pot, the cam roll 54 will be actuated to displace the valve rod 50 downwardly to open the vacuum valve 49. Beneath the vacuum valve is arranged a spring 56 the lower end of which is adapted to co-operate with a plunger tip 57 in such a manner that the opening of the vacuum valve causes the spring 56 to be compressed and to force the plunger tip tightly into contact with the top of the blank mold thereby sealing the opening in the upper end of the blank mold against the upward flow of glass which takes place by virtue of the vacuum produced in the mold.

Figures 2A, 6:
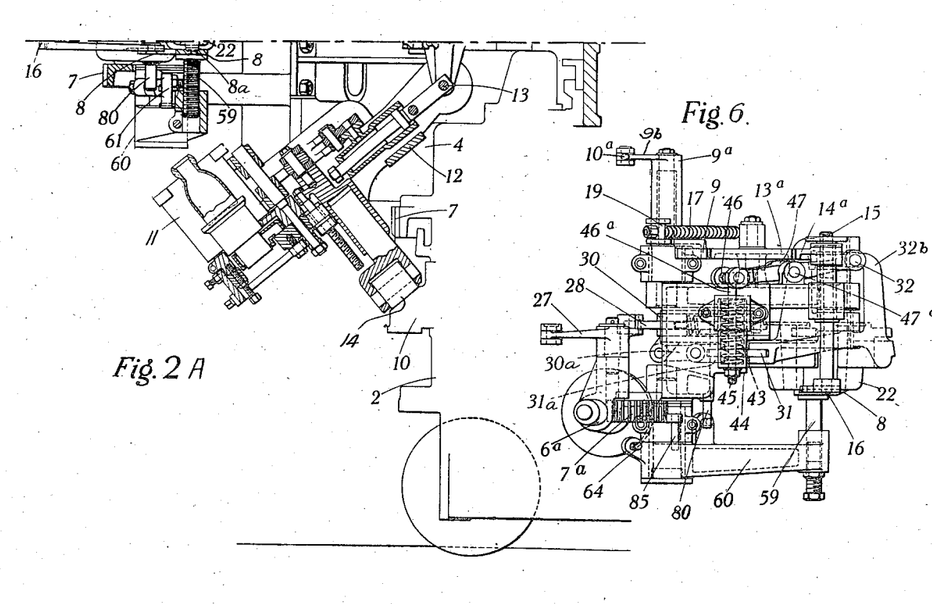
Fig. 6 is a front elevation along the line G—G of Fig. 3.

After the opening of the vacuum valve and the consequent filling of the mold with glass, the suction head 33 is lifted by action of the cam 34, cam roll 35, connecting rod 37, rack 38, sectors 39 and 40 and rack 40a the amount of the lift being sufficient to permit the blank mold to be raised by the action of the spring 43 to the cut-off knife level. The cut-off is timed to take place almost immediately after such level is reached and as soon as the blank mold has arrived in a suitable position over the forehearth or revolving pot. The cut-off of the hanging glass is brought about by the action of the cam 12a in releasing the spring 17 (see Fig. 3) so that the sectors 9, 13a and 14a, the shaft 15 and the knife arm 16 are actuated to swing the cut-off knife 8 across the lower end of the blank mold, the arrangement being such that the knife is brought to rest with a circular recess 8a formed in the upper surface of the knife disposed beneath and coaxially with the blank mold opening (as is shown in Fig. 2A) after shearing the hanging glass. The adjustment of the mechanism necessary to cause the knife to come to rest in this position can be effected by displacing the position of the nut 17a on its rod 18a. Upon registration of the recess 8a with the lower end of the blank mold, the parison will fall slightly to fill the recess. The suction head is then lifted clear of the upper end of the blank mold by the continued action of the cam 34, cam roll 35, rack 38, sectors 39 and 40 and rack 40a and, at the same time, the vacuum valve 49 is caused to close under the action of the cam 55.

At this stage, the blank mold is ready to be swung inwardly so as to return the same to its inner arcuate path and this is brought about through the medium of the cam track 3a, cam roll 4a, cam slide 5a, the toothed rack 6a and the toothed sector 7a which is secured to the blank mold arm 20, the charged blank mold being brought to rest in a position beneath a register head 58 at which position the pressing operation is to take place. At a point substantially midway between the outer and inner positions of the blank mold, the underside of the cut-off knife by which the lower end of the parison is being supported, is caused to slide over an upstanding support screw 59 (see Figs. 1, 2, 3, 4 and 6) threaded into a pressing support arm 60 mounted for angular movement in a horizontal plane about the same axis as that around which the blank mold arm 20 is arranged to be moved, viz. the axis 21. Also, when the screw 59 is located centrally under the knife and the blank mold, a downwardly extending pin 60 provided for the purpose on the blank mold arm is caused to engage a stop screw 61 mounted in position on the arm 60 so that the latter is moved along with the blank mold arm into a position beneath the register head 58.

The register head and the neck mold arm 62 may then be lowered in a manner similar to that normally employed in a Moorshead machine so that the arms register with the recess in the top of the blank mold and thereafter, also in a manner similar to that commonly employed on a Moorshead machine, locking dogs may be dropped into position and a pressing plunger 63 (Fig. 2) may be lowered through the neck mold and into the blank mold so as to press the glass upwardly into the former whilst at the same time forming a cavity in the upper end of the parison. The means for raising and lowering the pressing plunger may be similar to those described in U. S. Patent No. 1,807,857 or a suitable modification thereof and are also adapted to be brought into operation by a cam track formed in or on a cam plate carried by the central column of the machine.

The further operations necessary to complete the formation of the ware follow the lines of those usually adopted in a machine of the type with which the present invention is concerned and, as they are described fully in U. S. Patent No. 1,807,857 already referred to, it is unnecessary to describe these again in detail. In order, however, to make the operation of the machine as a whole clear, there is set out below the sequence of operations performed in the making of one piece of ware, it being understood that the cycle of operations is repeated a number of times during one complete revolution of the machine, said number corresponding with the number of blank molds carried by the machine.

Figure 5:
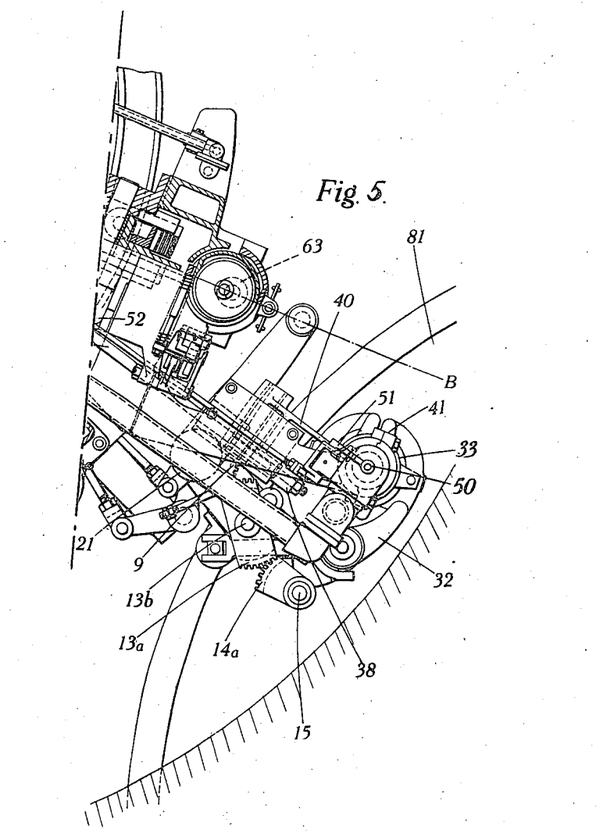
Fig. 5 is a sectional plan view taken on the line F—F of Fig. 2 with the blank mold arm swung out and the suction head lowered and showing the pressing plunger.

Assuming the blank mold to be moving along its inner arcuate path and approaching the gathering position, the blank mold arm 20 by which the mold is carried is swung outwardly or away from the centre of the machine by the action of the cam roll 4a in its cam track 3a and by the cooperative actions of the rack 6a and sector 7a. In this manner, the mold is brought into position over the forehearth or revolving pot indicated at 81 in Figs. 1 and 5. Also, during and by such outward swinging movement, the cut-off knife 8 is brought into a position ready for cutting and the cut-off knife spring 17 is compressed as shown in Fig. 3, this being brought about by the action of the cam 12a, cam roll 11a and co-operating parts including the sectors 9, 13a, and 14a. Either before or during the outward swinging movement above referred to, the two halves of the blank mold are closed and pressed together by the action of the cam track 23, cam roll 24 and co-operating parts including the bell-crank lever 27 and toggle links 31. The suction head 33 and the plunger tip 57 are then caused to descend by the operation of the cam roll 35 in its cam track 34 to bring the spigot 33a into registration with the recess formed in the upper end of the blank mold and, by the continued downward movement of the suction head, the lower end of the blank mold is pressed into the mass of glass in the forehearth or revolving pot in opposition to the force exerted by the spring 43 which becomes compressed. The vacuum valve 49 is then lowered and opened by the conjoint operation of the cam plate 55 and cam roll 54 and the blank mold becomes in consequence, filled with molten glass whereupon, owing to the shaping of the cam track 34, the blank mold and the suction head are raised clear of the glass, by the release of the spring 43, to the cut-off level. The cam roll 11a then moves inwardly on the cam 12a with the result that the cut-off knife 8 is swung across the lower end of the blank mold by the action or release of the compressed spring 17 and is brought to rest with its recess 8a registering with the opening in the lower end of the blank mold. In the meantime, the suction head 33 is lifted by the action of the cam roll 35 clear of the upper end of the blank mold and the glass in the latter settles in the recess in the cut-off knife. The blank mold arm 20 is now swung inwardly to bring the mold into its inner arcuate path by the action of the cam roll 4a and, during this movement, the cut-off knife 8 is moved with the blank mold so that it remains in contact with the lower end thereof. At approximately midway between the inner and outer positions of the mold, the pin 80 engages the stop screw 61 on the pressing support arm 60 with the result that the latter is also swung inwardly along with the blank mold and the cut-off knife to bring the outer end thereof into position beneath the register head 58 and pressing plunger 63. The register head is then lowered to bring the same into registration with the blank mold and immediately thereafter the pressing plunger is lowered into the blank mold whilst the lower end of the parison is supported, thereby forcing the glass up into the neck mold. The pressing plunger is then raised clear of the register head and the latter lifted slightly after which the blank mold is opened by the action of the cam roll 24 and toggle links 31. The register head is then raised further to lift the pressed parison clear of the recess in the cut-off knife and of the upper surface of the latter whereupon the cam roll 4a is brought into operation again to swing the blank mold outwardly ready for recharging. At this stage, a downwardly extending pin 85 carried by the blank mold arm is brought into engagement with a stop screw 64 on the pressure support arm 60 in order to swing the latter out from under the parison into the position shown in Fig. 4 clear of both the finishing mold and the revolving pot. The finishing mold 11 is now raised and closed around the parison, in known manner, suspended from the neck mold whereupon the blow slide 66 is moved into position and the blowing effected.

Having thus described my said invention, what I claim as new therein and desire to secure by Letters Patent is:—

1. A glass shaping machine comprising a central column, a plurality of molds mounted for movement around said column, means controlled by the rotation of said molds for swinging the same in a horizontal plane, whereby the molds travel at one time in an outer path and at another time in an inner path, means for pressing the molds traveling in said outer path downwardly into a forehearth, means for connecting the interior of the depressed molds to a source of suction, a cut-off knife mounted for angular movement across the lower end of the mold, a spring associated with said knife, means controlled by the outward swinging movement of the mold for compressing said spring, and means for releasing said spring to cause said spring to swing the cut-off knife across the lower end of the mold.

2. A glass shaping machine comprising a rotatable frame, a series of arms pivoted to said frame, a plurality of neck molds carried by said frame and arranged to travel continuously in an inner circular path, a blank mold supported by each said arm, means for swinging said blank mold supporting arms about their pivots so that at times the molds are moving in an outer circular path and at other times in a circular path beneath said neck molds, means for pressing the molds traveling in the outer path downwardly into a forehearth and connecting the interiors thereof to a source of suction to draw a charge of glass therein, including a plurality of suction heads mounted on said frame and rotatable in a path corresponding to the outer circular path of said molds, means for moving said suction heads into and out of engagement with said molds, and means for pressing the charge of glass in the blank molds while such molds are traveling in the path of said neck molds.

3. A glass shaping machine comprising a frame, a plurality of blank molds pivoted to said frame and movable about their pivots so that at times the molds are moving in an outer arcuate path and at others they are moving in an inner arcuate path, means for swinging the molds from one path to the other, means for lowering and filling each said mold while such mold is traveling in the outer arcuate path, means for raising each filled mold, a spring actuated severing implement associated with each mold, and means associated with said mold swinging means for placing the spring of each said implement under compression as said molds are swung to their outer path and means for releasing said spring as said mold is raised to move said severing implement underneath its respective mold, and for positioning it thereunder, said severing implement being formed with a recess adapted to register with the opening in the lower end of the mold.

4. A glass shaping machine comprising a frame, a plurality of blank molds pivoted to said frame, a plurality of neck ring molds one for each blank mold carried by said frame and movable in a circular path, a plurality of suction heads one for each blank mold carried by said frame and adapted to travel in a path concentric to but surrounding the path of travel of said neck ring molds, means for swinging each said blank mold about its pivot so that at times each blank mold is moving in a path underneath a suction head and at others it is moving in a path underneath a neck ring mold, means for moving each said suction head into and out of engagement with the blank mold traveling therebeneath to dip the mold into a forehearth and gather a charge of molten glass therein, means responsive to the movement of a charged mold into association with a neck ring mold for positioning a supporting member thereunder, and means for pressing the charge in said mold while associated with such neck ring mold.

5. A glass shaping machine as claimed in claim 4 in which the support member comprises an arm mounted for angular movement in a horizontal plane and which is adapted to be engaged and moved on the swinging movement of the mold so that it moves along with the mold into a position beneath the pressing means.

6. In a machine for forming hollow glass articles, the combination of a neck ring mold, a suction head spaced from said neck ring mold, an open ended blank mold mounted for movement between said neck ring mold and said suction head, means for swinging said blank mold between said neck ring mold and said suction head, means for moving said suction head into and out of engagement with the blank mold positioned thereunder to press the mold downwardly into a bath of molten glass and fill said mold, means for raising said blank mold as said suction head is moved out of engagement therewith, and means for severing the glass stringing from said blank mold, including a shear blade, and a spring for actuating said blade, and means responsive to the movement of said mold toward said suction head for placing said spring under compression.

7. In a machine for forming hollow glass articles, the combination of a neck ring mold, a suction head spaced from said neck ring mold, an open ended blank mold mounted for swinging movement from a position underneath said neck ring mold to a position underneath said suction head, means for swinging said blank mold, means for moving said suction head into and out of engagement with the blank mold positioned thereunder to press the mold downwardly into a path of molten glass and draw a charge into said mold, means for raising said blank mold as said suction head is moved out of engagement therewith, and means associated with said blank mold for severing the glass stringing from said mold, including a shear blade, a spring for actuating said shear blade, means responsive to the movement of said mold to a position underneath said suction head for compressing said spring, and means for releasing said compressed spring to actuate said shear blade.

8. In a machine for forming hollow glass articles, the combination comprising a blank mold, means for moving said blank mold between a charging position and a pressing position, means cooperating with said blank mold at the charging position for lowering said mold into a bath of molten glass and drawing a charge thereinto, a knife for severing the glass stringing from said mold and for closing the lower end thereof, a neck ring adapted to register with said blank mold at the pressing position, means at the pressing position for pressing the charge in said mold, and auxiliary means for supporting said blank mold during the pressing operation, including a horizontally swinging supporting arm adapted to be engaged by and carried with said mold as it moves from the charging position to the pressing position.

9. In a machine for forming hollow glass articles, the combination of a rotatable frame, a series of suction heads carried by said frame, and a series of neck ring molds carried by said frame and adapted to travel in a path concentric to the path of travel of said suction heads, a series of open ended blank molds, laterally swinging arms connecting said blank molds to said frame, means for swinging said arms so that the blank molds travel for a portion of each revolution in a path underneath said suction heads and for the remainder of each revolution in a path in registration with the neck ring molds, means for moving said suction heads into engagement with the molds traveling thereunder to press said molds downwardly into a bath of molten glass and draw a charge thereinto, means for raising each filled blank mold when said suction head is withdrawn therefrom, means for severing the glass stringing from said blank molds and for closing the bottom thereof, blank supporting means adapted to be engaged by said blank molds and carried therewith to a position underneath said neck ring molds, and means projecting through said neck ring mold for pressing the ware in said blank mold.

10. In a machine for forming hollow glass articles, the combination comprising a plurality of rotating blank molds, means for swinging said molds from a charging position to a pressing station, means adapted to cooperate with said molds at the charging position for drawing a charge of molten glass thereinto, means responsive to the swinging movement of said molds for severing the glass stringing from each said mold and for supporting the charge therein, a plurality of rotating neck ring molds, one for each blank mold, adapted to move into registration with said blank molds at the pressing station, a blank mold supporting member, means responsive to the movement of a charged blank mold to the pressing station for moving said supporting member underneath said blank mold, and means at the pressing station for pressing the charges in the molds and for filling said neck ring molds.

11. In a machine for forming hollow glass articles, the combination of a series of rotating blank molds, a suction head for each blank mold adapted to be moved into and out of engagement with its respective blank mold, a valve in said suction head, means for periodically operating said valve to connect the interior of each suction head to a source of suction, and means for sealing the top of said blank mold while said suction head is in engagement therewith, including a plunger tip floatably mounted within said suction head, and means responsive to the operation of said valve for forcing said plunger tip into contact with said blank mold when said head is connected to the source of suction.

12. A glass shaping machine of the press and blow type comprising a table mounted for rotation around a stationary central column, a plurality of blank molds pivotally mounted on said table, a plurality of neck molds carried by said table and adapted to move around said column in an inner circular path on rotation of said table, a plurality of vertically movable suction heads carried by said table and adapted to move in an outer circular path around said column, means for swinging said blank molds about their pivots in a horizontal plane so that at times each successive mold is moving in the outer path beneath and in registry with a suction head and at other times each said mold is moving in the inner path beneath and in registry with a neck mold, means for moving each said suction head vertically into contact with the mold traveling in the outer path and to press the same downwardly into a forehearth to gather a charge therein by suction while such mold is moving continuously in an upright position, and means associated with each neck ring mold and adapted to pass therethrough for pressing the charge of glass in the blank mold positioned thereunder.

13. A glass shaping machine comprising a table mounted for rotation around a central column, a series of arms pivotally mounted on said table, a partible blank mold carried by each said arm, means for opening and closing each said blank mold, means for swinging each said arm in a horizontal path about its pivot so that at times the mold carried thereby is moving in an outer path and at other times in an inner path, means for pressing the molds traveling in said outer path downwardly into a forehearth to gather a charge therein including a plurality of suction heads carried by said table, one for each mold, and adapted to move always in a path above the outer path of the molds, means for raising and lowering the suction heads into and out of engagement with said molds, and means for pressing the charge in said molds while such molds are traveling in the inner path.

14. A glass shaping machine comprising a table mounted for rotation around a central column, a series of blank molds pivotally mounted on said table, means for opening and closing each said mold, means for swinging each said closed mold in a horizontal plane about its pivot so that at times the closed molds are moving in an outer path and at others they are moving in an inner path, a series of neck molds carried by said table and adapted to rotate continuously above the inner path of travel of said blank molds, means operable while said blank molds are traveling in the outer path for pressing the same downwardly into a forehearth and gathering a charge of molten glass therein, and means operable while said molds are traveling in the inner path for pressing the charge of molten glass in said molds.

15. A glass shaping machine comprising a rotatable frame, a plurality of blank molds pivotally mounted on said frame, means for opening and closing said blank molds, means operable when said molds are closed for swinging said molds in a horizontal plane about their pivots whereby at times each said closed mold is moving in an outer path and at other times in an inner path, a plurality of suction heads, one for each mold, carried by said frame and movable in a circular path above the outer path of travel of said molds, means for raising and lowering said heads to move them into and out of engagement with the molds traveling said outer path to dip said molds into a forehearth and gather a charge therein, a spigot on each head adapted to register with a recess formed in the upper end of the mold and means operable when said molds are traveling in the inner path for pressing the charges gathered therein.

16. A glass shaping machine comprising a table rotatable around a central column, a series of arms pivoted to said table, a mold carried by each said arm, means for swinging each of said arms about its pivot to move the mold carried thereby between inner and outer paths during the rotation of said table, means for yieldably mounting each of said molds on its respective arm including a vertically movable sleeve carrying said mold, a lever pivoted to said arm and having one end connected to said sleeve, a spring for resisting turning movement of said lever, and means for pressing the molds traveling the outer path downwardly into a forehearth and connecting the interiors thereof to a source of suction, including a plurality of suction heads, one for each mold, mounted on said table, and moving continuously in a path corresponding to the outer path of said molds, and means for moving said suction heads into and out of engagement with their respective molds and to move such mold downwardly and turn said lever in opposition to said spring, said spring acting to return the mold to its initial position after such suction head is raised.

17. In a machine for forming hollow glass articles, the combination of a table mounted for rotation, a plurality of blank molds pivoted to said table, means for dipping said molds successively into a path of molten glass and connecting each said mold to a source of suction to draw a charge of molten glass thereinto, a plurality of neck ring molds carried by said table, means for effecting a severance of the glass stringing from said blank molds and for closing the lower ends thereof, means for swinging each of the charged molds about its pivot to a position underneath a neck ring mold, a series of mold supporting members pivoted to said frame, means associated with each said blank mold for moving a supporting member into mold supporting position as said blank mold is moved to a position beneath a neck ring mold, and means for pressing the charges in said blank molds and for forcing the glass therein into the cooperating neck ring molds.

THOMAS COURTNEY MOORSHEAD.

CERTIFICATE OF CORRECTION.

Patent No. 2,081,895.   May 25, 1937.

THOMAS COURTNEY MOORSHEAD.

It is hereby certified that error appears in the printed specification of the above numbered patent requiring correction as follows: Page 6, second column, line 47, claim 17, for the word "path" read bath and for "connectiong" read connecting; and that the said Letters Patent should be read with these corrections therein that the same may conform to the record of the case in the Patent Office.

Signed and sealed this 27th day of July, A. D. 1937.

Henry Van Arsdale (Seal)   Acting Commissioner of Patents.